INVENTORS
GENNADY POTAPENKO,
JOHN K. LYON
BY THEIR ATTORNEYS
HARRIS, KIECH, RUSSELL & KERN

United States Patent Office 3,176,889
Patented Apr. 6, 1965

3,176,889
PRESSURIZED DISPENSER WITH INTEGRAL STEM SEAL
Gennady Potapenko, 1718 Oakdale St., and John K. Lyon, 1176 Afton, both of Pasadena, Calif.
Original application Aug. 14, 1961, Ser. No. 131,395. Divided and this application Mar. 4, 1963, Ser. No. 262,662
7 Claims. (Cl. 222—394)

The present invention relates generally to the container art and more particularly to a novel pressurized dispenser for discharging measured amounts of pressurized fluid material, preferably in spray form.

Briefly stated, the present invention includes a valve assembly mounted in the neck portion of a pressurized container, said assembly including a housing member and a stem member. A passageway providing a transfer chamber and a measuring chamber extends through the housing member for communication with the interior of the container. A plurality of vertically spaced annular flanges or cup-like elements and co-operating cylindrical wall surfaces are provided in the passageway, thereby when the stem member is actuated, fluid under pressure is first admitted to the measuring chamber and a measured amount of fluid is then channeled through the transfer chamber and dispensed from a discharge port contained in an actuating cap. Both the stem member and the housing member are preferably of unitary construction and molded from plastic material.

As is well known in the art, there are many types and styles of pressurized dispensers or containers in use at the present time. However, for the most part the known constructions are relatively expensive and contain numerous parts which require extensive machining and the maintaining of close tolerances.

It is an object of the present invention, therefore, to provide a novel pressurized dispenser which is extremely simple in construction and relatively inexpensive to manufacture. More particularly, it is an object to provide such a dispenser which consists essentially of a container and a simple two-part valve assembly.

Another object is to provide a dispenser which contains a relatively simple and inexpensive valve for dispensing measured amounts of fluid material. More particularly, it is an object to provide such a valve which consists essentially of two parts which function both as a valve and as a measuring means. Specifically, it is an object to provide a simple valve which also functions as a measuring means, and which can be molded from conventional plastic materials.

Yet another object is to provide a valve construction whereby the container can be pressurized by connecting the discharge side of the valve to a source of pressurized gas.

Further objects and advantages of the present invention will be apparent from the following detailed description, reference being had to the accompanying drawings wherein preferred embodiments of the present invention are shown.

Figure 1:
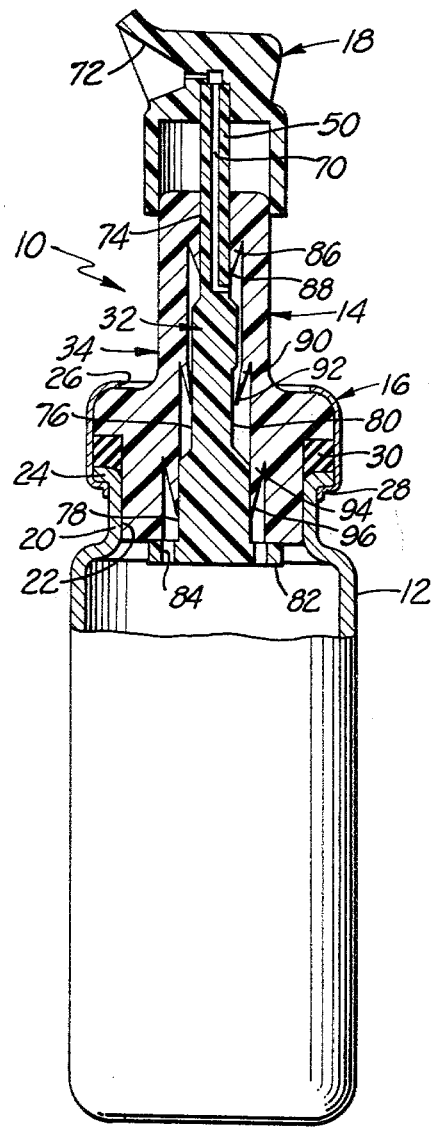
FIG. 1 is a vertical sectional view of a pressurized dispenser constructed in accordance with the teachings of the present invention, showing the valve in the closed position relative to the interior of the container after a measured amount of fluid material has been discharged from the device.

Referring to the drawings more particularly by reference numerals, 10 indicates generally a pressurized dispenser with integral stem seal embodying the teachings of the present invention, which includes a container 12, a valve assembly 14, and an actuating cap 18 at the upper end of the device.

The container 12 is of conventional construction and preferably molded of plastic material, and includes a neck portion 20 with an inner wall surface 22 and an upper lip 24.

The tubular connector 16 which may be made of metal fastens the valve assembly to the container and includes an aperture 26 at the upper end thereof, and a flange 28 at the lower end which engages the lip 24 of the container. A resilient washer 30 may be interposed between the container and the valve assembly for sealing purposes.

The valve assembly includes a valve stem member 32 and a valve housing member 34, each of which is preferably of unitary construction and molded from plastic material. The valve stem member includes a stem portion 50 which contains a discharge passageway 70 in communication with the discharge port 72 contained in the cap 18. The stem portion 50 provides an upper cylindrical wall surface 74, and below it an intermediate cylindrical wall surface 76 which merges into a lower cylindrical wall surface 78, each of said wall surfaces being of a greater diameter than the one immediately above it. However, the wall surface 76 is cut away or flattened on one side as at 80 to provide communication between two of the chambers as will be described more fully hereinafter. A disc-like stop member 82 containing spaced apertures 84 is provided at the lower end of the valve stem member 32.

Figure 2:
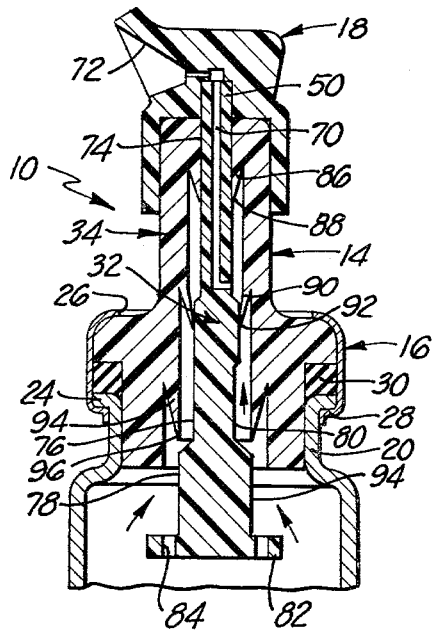
FIG. 2 is a fragmentary vertical sectional view similar to FIG. 1 showing the same valve in the open position in communication with the interior of the container.
Figure 3:
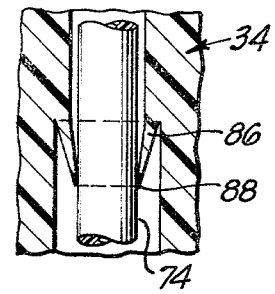
FIG. 3 is an enlarged fragmentary vertical sectional view of the upper portion of the valve housing member shown in FIGS. 1 and 2 illustrating the details of one of the cup-like sealing elements.

Turning to a consideration of the housing member 34, it includes an upper annular flange or cup-like element 86 with a lip portion 88, an intermediate cup-like element 90 with a lip portion 92, and a lower cup-like element 94 with a lip portion 96. The lip portion of each of these cup-like elements extends inwardly so as to engage the wall surface adjacent thereto in sealing relationship. This construction is clearly shown in FIG. 3 which is an enlarged fragmentary view adjacent the upper cup-like element 86 shown in FIGS. 1 and 2 and which shows the lip portion 88 extending inwardly into sliding sealing engagement with the upper wall surface 74 of the valve stem member.

As mentioned above, both the valve stem member 32 and the valve housing member 34 are preferably of unitary construction and molded from plastic material. Also, the plastic material from which the housing is formed is preferably softer than the stem material so that the deformation occurs at the lips of the cup-like elements rather than in the stem member.

When the valve is in the closed position (FIG. 1), the fluid in the container 12 is prevented from flowing upwardly through the passage containing the valve stem member by the lower cup-like element 94 which is in sealing engagement with the lower wall surface 78. It will be noted that the pressurized fluid, passing upwardly through the apertures 84 acts against the outer surfaces of the lower cup-like element 94 so as to increase its sealing engagement with the lower wall surface 78.

When the cap 18 is depressed so as to move the valve stem member 32 to the open position (FIG. 2) the pressurized fluid flows upwardly around the lower wall surface 78, through the lower cup-like element 94 and into a measuring or metering chamber, the upper end of which is defined by the intermediate cup-like element 90 which has its lip portion 92 in sealing engagement with the intermediate wall surface 76. When the cap 18 is released and the valve stem member 32 moves upwardly, the lip portion 96 of the lower cup-like element will engage the lower wall surface 78 in sealing engagement before the lip portion 92 of the intermediate cup-like element reaches the flattened portion 80, whereby a measured amount of fluid is trapped in the measuring chamber between the intermediate and the lower cup-like elements. As the valve stem member 32 continues to move upwardly, the flattened portion 80 will pass under the lip portion 92 of the intermediate cup-like element, thereby permitting the fluid to flow past the intermediate cup-like element, through the passageway 70, and out through the discharge port 72.

The upper cup-like element 86 prevents the escape of fluid from the upper or transfer chamber around the stem portion 50, and the resilient washer 30 prevents the escape of fluid from between the neck of the container and the valve housing member.

The pressurizing or charging of the container can be accomplished by connecting the upper part of the discharge passageway 70 to a source of pressurized gas. This can be done when the valve is either in its closed or open position because the cup-like elements 86, 90 and 94 will flex outwardly and away from their co-operating wall surfaces when the flow of fluid material is in the downward direction at an increased pressure.

Thus, it is apparent that there has been provided a novel pressurized dispenser which fulfills all of the objects and advantages sought therefor.

It is to be understood that the foregoing description and the accompanying drawings have been given only by way of illustration and example and that changes and alterations in the present disclosure which will be readily apparent to one skilled in the art are contemplated as within the scope of the present invention.

This application is a division of our copending application, Serial No. 131,395.

We claim:

1. A pressurized dispenser, comprising:
a container having a neck portion;
a valve assembly fastened to said neck portion and including a housing member;
a passageway in said housing adapted to communicate with the interior of the container;
vertically spaced upper, intermeditae, and lower continuous flange elements formed on said housing and projecting into the passageway, each of said flange elements including an inner lip portion,
the upper and intermediate flange elements defining, in part, a transfer chamber, and the intermediate and lower flange elements defining in part a measuring chamber;
a stem member mounted in the passageway for axial movement relative to the housing member between an open position and a closed position,
said stem member containing an upper wall surface in sliding sealing engagement with the lip portion of the upper flange element, an intermediate wall surface adapted to engage the lip portion of the intermediate flange element in sealing engagement, and a lower wall surface adapted to engage the lip portion of the lower flange element in sealing relationship;
channel means providing communication between the transfer chamber and the measuring chamber when the stem member is in the closed position, the lip portion of the lower flange element being in sealing engagement with the lower wall surface when the stem member is in said closed position;
the lip portion of the intermediate flange element and the intermediate wall surface being in sealing engagement, and the lip portion of the lower flange element and the lower wall surface being in axial spaced relationship to provide communication between the measuring chamber and the interior of the container when the stem member is in the open position; and
passage means between the exterior of the container and the transfer chamber.

2. The pressurized dispenser set forth in claim 1 in which the valve housing and the valve stem member are molded from plastic material and each is of unitary construction.

3. The pressurized dispenser set forth in claim 1 in which the valve housing member and the valve stem member are molded from plastic material, and the material used for the housing member is softer than the material used for the stem member.

4. A pressurized dispenser, comprising:
a container having a neck portion;
a valve assembly fastened to said neck portion and including a housing member;
a passageway through said housing adapted to communicate with the interior of the container;
vertically spaced upper, intermediate, and lower annular cup-like sealing elements formed on said housing and extending into the passageway and in the direction of the interior of the container, each of said sealing elements including an inner lip portion,
the upper and intermediate sealing elements defining, in part, a transfer chamber, and the intermediate and lower sealing elements defining, in part, a measuring chamber;
an elongated stem member mounted in the passageway for axial movement relative to the housing member between an open position and a closed position,
said stem member containing an upper cylindrical wall surface in sliding sealing engagement with the lip portion of the upper sealing element, an intermediate cylindrical wall surface adapted to engage the lip portion of the intermediate sealing element in sealing engagement, and a lower wall surface adapted to engage the lip portion of the lower sealing element in sealing relationship;
a channel in the intermediate wall surface for providing communication between the transfer chamber and the measuring chamber when the stem member is in the closed position, the lip portion of the lower sealing element being in sealing engagement with the lower wall surface when the stem member is in said closed position;
the lip portion of the intermediate sealing element and the intermediate wall surface being in sealing engagement, and the lip portion of the lower sealing element and the lower wall surface being in axial spaced relationship to provide communication between the measuring chamber and the interior of the container when the stem member is in the open position; and
passage means between the exterior of the container and the transfer chamber.

5. The pressurized dispenser set forth in claim 4 in which the normal diameter of the lip portion of each annular sealing element is less than the diameter of the co-operating wall surface on the stem member adjacent thereto, whereby said lip portion is deflected toward the interior of the container when it is in sealing engagement with its co-operating wall surface.

6. The pressurized dispenser set forth in claim 1 in which separate sealing means is provided between the housing member and the neck portion of the container to prevent the passage of fluid therebetween, and the upper flange element provides the seal between the housing member and the stem member to prevent the escape of fluid therebetween.

7. A pressurized dispenser, comprising:
a container having a neck portion;

a valve assembly fastened to said neck portion and including a housing member;
a stepped passageway in said housing member adapted to communicate with the interior of the container;
vertically spaced upper, intermediate, and lower continuous flange elements formed on said steps in said housing member and projecting into the passageway, each of said flange elements including an inner lip portion,
  the upper and intermediate flange elements defining, in part, a transfer chamber, and the intermediate and lower flange elements defining in part a measuring chamber;
a stem member mounted in the passageway for axial movement relative to the housing member between an open position and a closed position,
  said stem member including an upper wall surface in sliding sealing engagement with the lip portion of the upper flange element, an intermediate wall surface adapted to engage the lip portion of the intermediate flange element in sealing engagment, and a lower wall surface adapted to engage the lip portion of the lower flange element in sealing relationship;
channel means providing communication between the transfer chamber and the measuring chamber when the stem member is in the closed position, the lip portion of the lower flange element being in sealing engagement with the lower wall surface when the stem member is in said closed position;
the lip portion of the intermediate flange element and the intermediate wall surface being in sealing engagement, and the lip portion of the lower flange element and the lower wall surface being in axial spaced relationship to provide communication between the measuring chamber and the interior of the container when the stem member is in the open position; and
passage means between the exterior of the container and the transfer chamber.

References Cited by the Examiner

UNITED STATES PATENTS

| | | | |
|---|---|---|---|
| 2,565,954 | 8/51 | Dey | 239—579 X |
| 2,744,665 | 5/56 | Carlson et al. | |
| 2,775,483 | 12/56 | Treharne et al. | |
| 2,788,925 | 4/57 | Ward. | |
| 2,831,617 | 4/58 | Soffer. | |
| 2,877,936 | 3/59 | Michel. | |
| 2,973,123 | 2/61 | Rousset | 222—518 X |
| 3,064,865 | 11/62 | Scoggin et al. | |
| 3,109,625 | 11/63 | Steiman et al. | 25—353 |

RALPHAEL M. LUPO, *Primary Examiner.*